United States Patent [19]

Wang et al.

[11] Patent Number: 5,189,643
[45] Date of Patent: Feb. 23, 1993

[54] METHOD OF ACCURATE FAULT LOCATION USING COMMON REFLECTION POINT GATHERS

[75] Inventors: Shein S. Wang; David W. Bell, both of Ponca City, Okla.

[73] Assignee: Conoco Inc., Ponca City, Okla.

[21] Appl. No.: 847,446

[22] Filed: Mar. 5, 1992

[51] Int. Cl.⁵ .............................................. G01V 1/28
[52] U.S. Cl. ........................................ 367/38; 367/53; 367/73
[58] Field of Search ........................ 367/38, 50, 51, 52, 367/53, 73

[56] References Cited

U.S. PATENT DOCUMENTS

| | | | |
|---|---|---|---|
| 4,241,429 | 12/1980 | Bloomquist et al. | 367/52 |
| 4,736,347 | 4/1988 | Goldberg et al. | 367/46 |
| 4,766,574 | 8/1988 | Whitmore, Jr. et al. | 367/50 |
| 4,802,146 | 1/1989 | Moeckel | 367/52 |
| 4,802,147 | 1/1989 | Moeckel | 367/57 |
| 4,813,027 | 3/1989 | Tieman | 367/52 |
| 4,918,670 | 4/1990 | Wang | 367/38 |
| 4,953,140 | 8/1990 | Dablain | 367/73 |
| 4,953,142 | 8/1990 | Rimmer | 367/73 |
| 4,992,996 | 2/1991 | Wang et al. | 367/53 |
| 5,008,861 | 4/1991 | Gallagher | 367/38 |
| 5,089,994 | 2/1992 | Harlan et al. | 367/73 |

*Primary Examiner*—Ian J. Lobo
*Attorney, Agent, or Firm*—M. Kathryn Braquet Tsirigotis

[57] ABSTRACT

The invention relates to a method for locating correct near vertical boundary or fault positions in a velocity model using common reflection point (CRP) gathers. Conventional migration velocity analysis examines the migrated image for hints to correct the velocity model. Vertical boundaries such as faults or salt flanks must be accurately determined to produce reliable images of deeper reflectors. Previous methods have placed faults by trial and error, since a depth image of a nearly vertical boundary is difficult to produce. The present method examines the sensitivity of CRP gathers to abrupt lateral changes across a nearly vertical fault to determine the location and the dip of a nearly vertical fault from a series of CRP gathers.

4 Claims, 6 Drawing Sheets

METHOD OF ACCURATE FAULT LOCATION USING COMMON REFLECTION POINT GATHERS

BACKGROUND OF THE INVENTION

1. Field of the Invention

The present invention relates to a method for accurately locating nearly vertical subsurface reflectors and more particularly to a method of using common reflection point gathers to quickly derive the accurate dip and location of a nearly vertical reflector or subsurface fault.

2. Related Prior Art

Depth migration iteratively constructs a model which reproduces the traveltimes observed on individual traces. That model is then used to migrate the data to produce a stacked depth section. It is well known that the quality of the model is important for successful depth migration. Conventional migration velocity analysis examines the migrated image for hints to correct the velocity model. Near vertical boundaries such as faults or salt flanks must be accurately positioned to produce reliable images of deeper reflectors. At present, they are placed by trial and error, since a depth image of a nearly vertical boundary is difficult to produce. If the errors caused by misplaced fault locations can be corrected, the result is a better depth image from better aligned events and a better correction to the velocities from a follow-up tomograph using the velocity tomography. Examples of seismic data processing methods which include migration and examples of methods for determining the location of subsurface interfaces are as follows.

U.S. Pat. No. 4,241,429 entitled "Velocity Determination and Stacking Process from Seismic Exploration of Three Dimensional Reflection Geometry" (Marvin G. Bloomquist et al) relates to a method for determining the dip and strike of subsurface interfaces and average propagation velocity of seismic waves. In seismic exploration, linear, multiple fold, common depth point sets of seismograms with three dimensional reflection geometry are used to determine the dip and strike of the subsurface reflecting interfaces and the average velocity of the path of the seismic energy to the reflecting interface. The reflections with each set appear with time differences on a hyperbola with trace spacing determined by the source receiver coordinate distance along the lines of exploration. The offset of the apex of this hyperbola is determined from a normal moveout velocity search of the type performed on two dimensional common depth point sets. This search identifies the correct stacking velocity and hyperbola offset which are used to determine dip, strike and average velocity.

U.S. Pat. No. 4,736,347 entitled "Multiple Stacking and Spatial Mapping of Seismic Data" (Bernard Goldberg et al) relates to a method for determining the dip of subsurface formations and the apparent acoustic velocity. Seismic traces are stacked in a plurality of orthogonal measures to form multiple stack traces at a positive offset. This stacking process determines the apparent velocities as functions of the travel time at the positive offset. The interval acoustic velocity of the first layer is then determined from knowledge of surface topography, source-receiver offset, two-way travel times and the first reflector apparent velocities. The first layer velocity information enables the incident and emergent angles of the raypaths at the surface to be calculated, as well as enabling the dip angles and spatial coordinates of the reflection points on the first reflecting boundary to be determined. Seismic data corresponding to the second reflecting boundary are then mapped spatially to the first reflecting boundary by ray tracing and by calculating the apparent velocities at the first boundary. The process is repeated for each succeedingly deeper boundary. The derived acoustic velocity model of the earth is displayed as a stacked seismic section in spatial coordinates.

U.S. Pat. No. 4,813,027 entitled "Method and Apparatus for Enhancing Seismic Data" (Hans Tieman) relates to a method and apparatus for stacking a plurality of seismic midpoint gathers to provide a pictorial representation of seismic events. The approximate propagation velocity, corresponding to a selected event in a common midpoint gather, is determined by summing the common midpoint gather using first and second weights to provide respective first and second weighted sums over an offset based on an estimated velocity corresponding to the event. A velocity error value indicative of the approximate error between the estimated velocity and the actual velocity is developed from the sums. The common midpoint gather is then re-stacked in accordance with the determined propagation velocity to provide an enhanced pictorial representation of the seismic event. The first and second weighted sums are taken over a time window centered upon an estimated zero offset travel time for the event. The first and second weights can be selected to provide rapid, slow or intermediate convergence upon the true velocity. The velocity error value is determined as a function of the derivation of the peak of the first weighted sum from the center of the time window, relative to the derivation of the peak of the second weighted sum from the center of the time window. Alternatively, the velocity error value is determined as a function of the derivation of the peak of the cross-correlation of the first and second weighted sums from the center of the time window.

U.S. Pat. No. 4,766,574 "Method for Depth Imaging Multicomponent Seismic Data" (Norman D. Whitmore, Jr. et al) relates generally to a method of geophysical exploration. This method may be used for imaging multi-component seismic data to obtain depth images of the earth's subsurface geological structure as well as estimates of compressional and shear wave interval velocities. In particular, measures are obtained of imparted seismic wavefields incident on reflecting interfaces in the earth's subsurface and of resulting seismic wavefields scattered therefrom. The incident and scattered wavefields are employed to produce time-dependent reflectivity functions which are representative of the reflecting interfaces. By migrating the time-dependent reflectivity functions, better depth images of the reflecting interfaces can be obtained.

U.S. Pat. No. 4,802,147 entitled "Method For Segregating And Stacking Vertical Seismic Profile Data In Common Reflection Point Bins" (George P. Moeckel) relates to a method for segregating and stacking vertical seismic profile data. The offset difference between the well location and the position of the source is divided into equal segments. Vertical seismic profile moveout corrected data is placed in common reflection point bins and stacked.

U.S. Pat. No. 4,802,146 titled "Method For Moveout Correction And Stacking Velocity Estimation Of Offset VSP Data" (George P. Moeckel) relates to a moveout correction process and velocity stacking estimation process to permit stacking of vertical seismic profile (VSP) data. The primary reflection time is determined by using the two-way travel time, the root mean square velocity of acoustic pulses in the formation and the first arrival time of direct path acoustic pulses.

U.S. Pat. No. 4,992,996 titled "Interval Velocity Analysis And Depth Migration Using Common Reflection Point Gathers" (Wang et al) relates to a method for performing velocity analysis while eliminating the effects on weak signals caused by strong signals which includes migrating each event of the prestack trace to a single location instead of all possible locations. The input trace is divided into many windows, and each window is migrated to a place determined by ray tracing the center of the window through the model. If the model is accurate, each event will be migrated to the proper location yielding an accurate depth section with no migration artifacts. As a by product, if the model is not accurate, the post migrated parts, migrated common offset depth sections sorted into common midpoint gathers provide an interpretable velocity analysis.

U.S. Pat. No. 5,089,994 titled "Tomographic Estimation Of Seismic Transmission Velocities From Constant Offset Depth Migrations" (Harlan et al) relates to a method for improving velocity models so that constant offset migrations estimate consistent positions for reflectors which includes tomographic estimation of seismic transmission velocities from constant offset depth migrations. A method of converting inconsistencies in reflector positioning from constant offset migrations into equivalent errors in modeled traveltimes is introduced, so that conventional methods of traveltime tomography can improve the velocity model.

SUMMARY OF THE INVENTION

The present invention examines the sensitivity of common reflection point gathers to abrupt lateral velocity changes across a near vertical fault. The method and apparatus of the present invention allows the practitioner to quickly converge on the accurate dip and location of a subsurface fault, thus accurate models can be built economically for depth migration. Specifically, the presence of a fault is ascertained in a velocity model and velocities on either side of the fault are found using common reflection point (CRP) velocity analysis. A CRP gather is constructed at a selected velocity near the fault on the velocity model. The correct fault location is determined by varying the dip of the fault in the velocity model until the CRP gather image is flat and varying the location of the fault to the right or the left in the model until broken-image events or discontinuities on the CRP gather image are eliminated. A series of CRP gathers may also be used, instead of a single CRP gather, to determine the correct location of the fault which will improve the accuracy of the method.

DESCRIPTION OF THE PREFERRED EMBODIMENT

The present invention describes a method which examines the sensitivity of common reflection point (CRP) gathers to abrupt lateral velocity changes across a near vertical boundary such as a subsurface fault or salt flank. In the following description, the terms near vertical boundary and fault are used interchangeably. The method of the present invention allows the practitioner to quickly converge on the correct dip and location of a fault, thus accurate models can be built economically for depth migration.

The method of the present invention works well when the velocity contrast across a fault is high. It detects the presence of a near vertical velocity boundary by its effect on the images underneath. Thus, the method of the present invention can be applied to other types of hard to image boundaries such as salt flanks, salt overhangs and reefs, whose seismic images are difficult to produce from conventional prestack depth migration. Boundaries that are not nearly vertical can usually be imaged clearly and their location, therefore, can be determined accurately. However, when this boundary is faulted, part of its limb sometimes cannot be imaged well. The result of a poorly imaged and therefore, poorly picked boundary is an even poorer image of the next boundary. At present, a trial and error approach is used to move the fault around, migrating with each guess until a good image emerges. Using the method of the present invention, the practitioner can quickly converge on the correct location and dip of a near vertical boundary or fault to produce reliable images of deeper reflectors.

Specifically, the presence of a near vertical boundary or fault is ascertained in a velocity model and velocities on either side of the fault are found using common reflection point (CRP) velocity analysis. A CRP gather is constructed at a selected velocity near the fault. The correct fault location is determined by varying the dip of the fault in the velocity model until the CRP gather image is flat and varying the location of the fault to the right or to the left in the velocity model until broken-image events or discontinuities on the CRP gather image are eliminated.

Figure 1A:
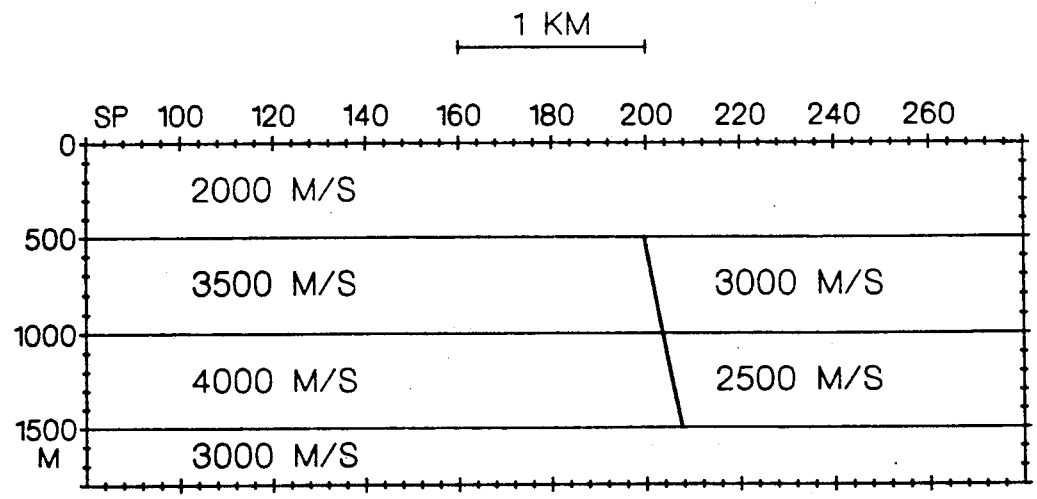
FIG. 1A illustrates a depth-velocity model with several flat boundaries separated by a near vertical fault.
Figure 1B:
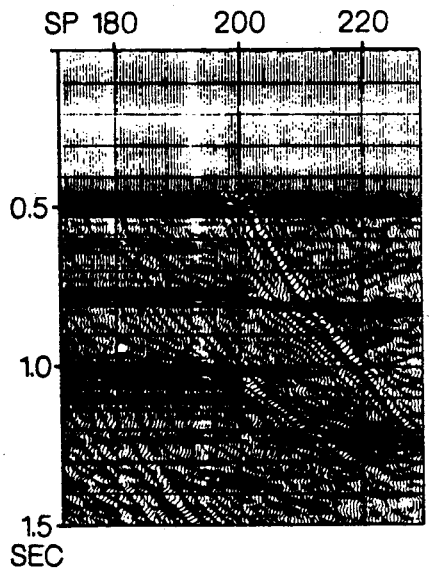
FIG. 1B is the resulting time migration of the model in FIG. 1A.
Figure 1C:
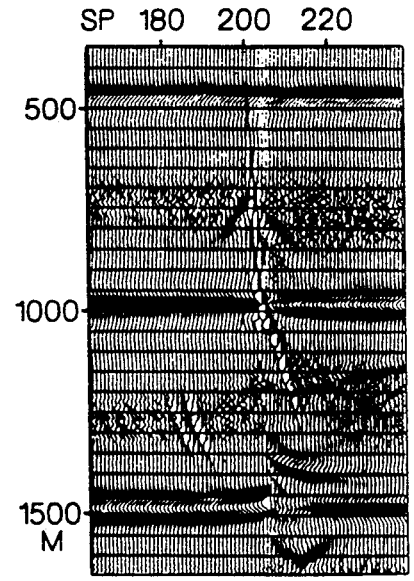
FIG. 1C is the resulting depth migration of the model in FIG. 1A.
Figure 2:
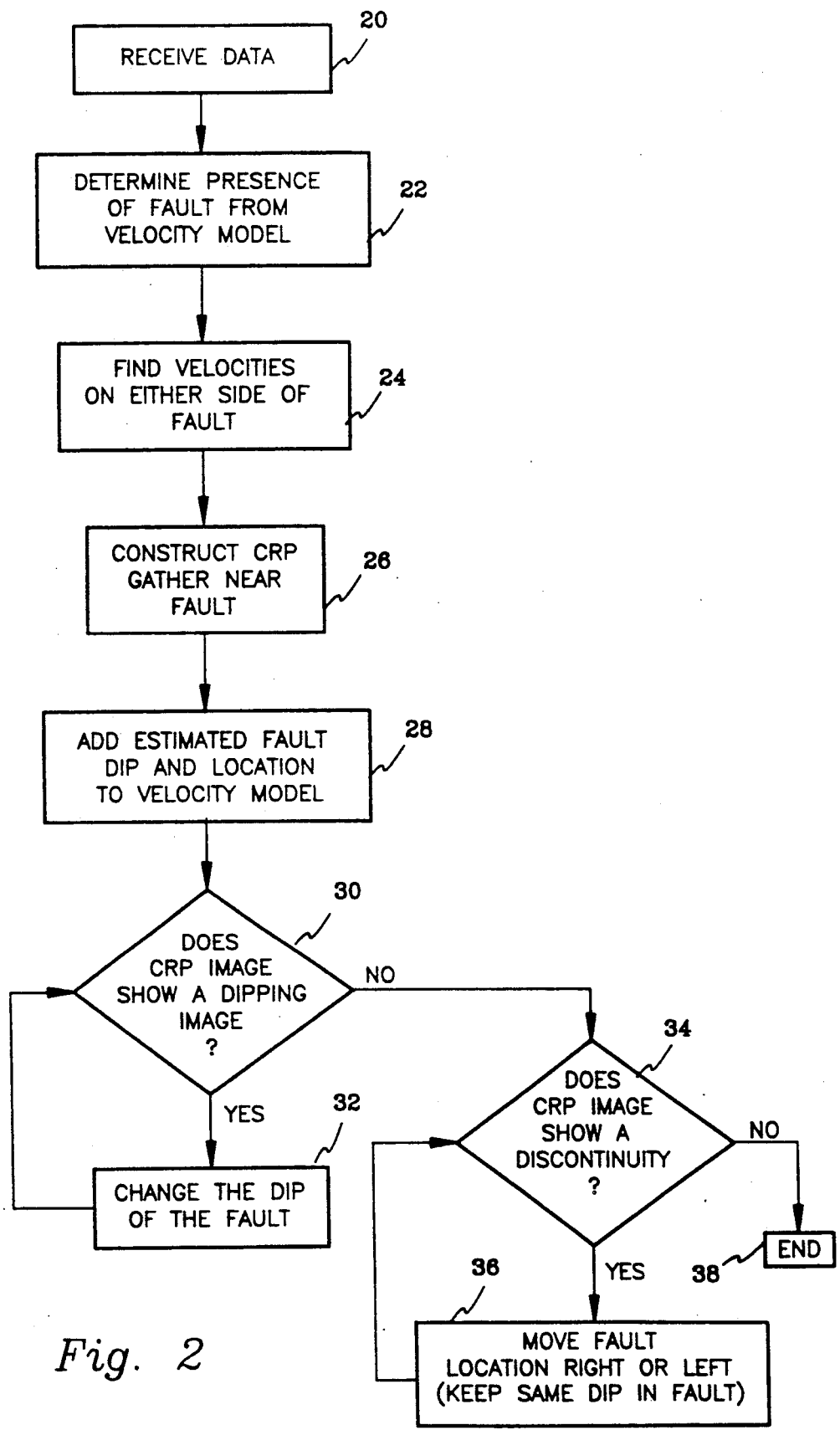
FIG. 2 illustrates a flow chart of the method of the present invention.

Referring now to FIG. 2, a flow chart of the method of the present invention is illustrated in block form. In block 20 data is received. This data preferably is in the form of a velocity model such as that shown in FIG. 1A, however, any format which can be placed in the form of a velocity model can be used. At block 22 the presence of a fault is ascertained from the velocity model data received. FIG. 1A shows a simple velocity model used as an example. There are several flat boundaries separated by a near vertical fault. The time migration of the velocity model is illustrated in FIG. 1B and the depth migration results are illustrated in FIG. 1C. Even though these results show the presence of a fault, the fault location can not be determined precisely from these sections because the fault is not imaged well.

Figure 3A:
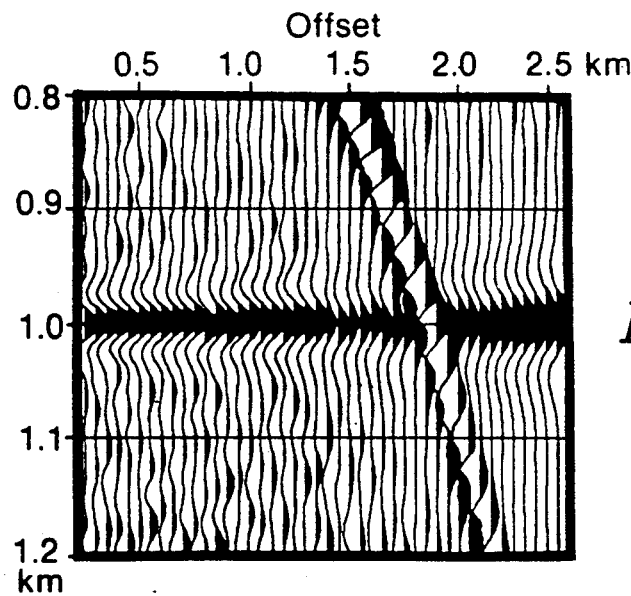
FIGS. 3A-3C are common reflection point (CRP) velocity analyses at various shot points (SPs) of the model in FIG. 1A.
Figure 3B:
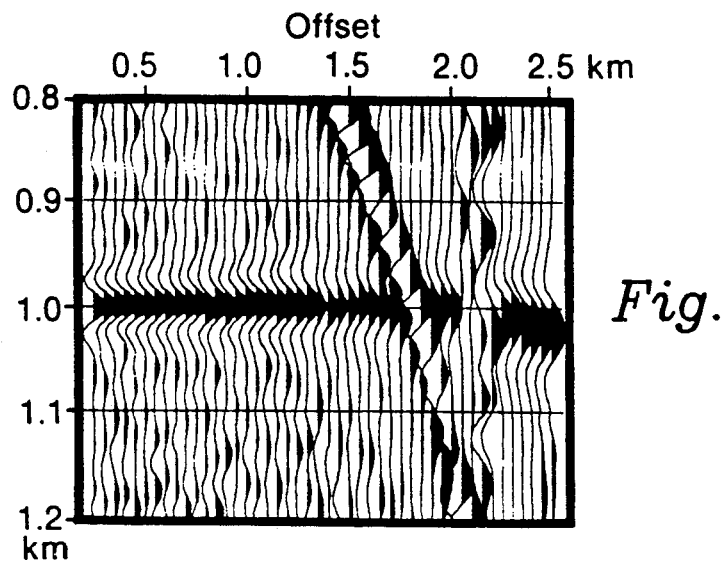
Figure 3C:
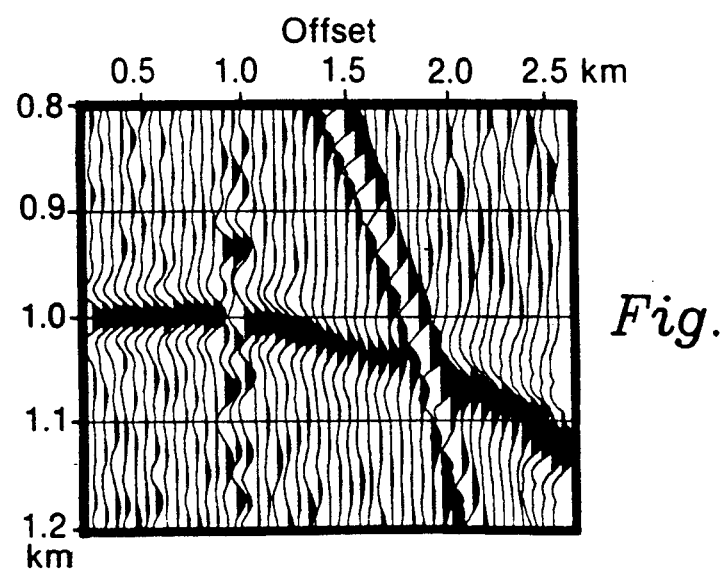

At block 24 velocities on either side of the fault are found using common reflection point (CRP) velocity analysis on the velocity model. In FIGS. 3A through 3C, CRP gathers at various SPs are illustrated. FIG. 3A shows the CRP at location SP 140, where the flat CRP image indicates the layer velocity is correct. FIGS. 3B and 3C show the CRPs at SP 170 and SP 190 which show increasing deviations from flatness on the far offset traces, indicating stronger influence from the fault as the traces get closer. These figures were generated assuming the velocity 3500 m/s is correct all the way across up to the model boundary, with no presence of the 3000 m/s layer. The abrupt down dip at the far offsets in FIGS. 3B and 3C means that the travel time for the recorded events are longer than expected, indicating that the corresponding raypaths have passed through a slower layer.

Figure 4:
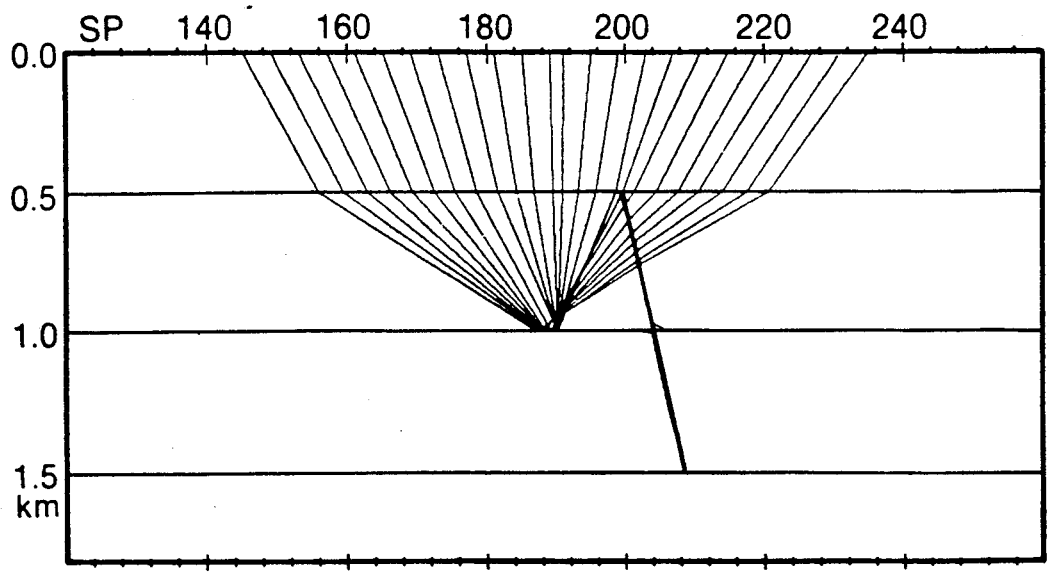
FIG. 4 illustrates the ray paths of the common midpoint gather (CMP) at SP 190.
Figure 5:
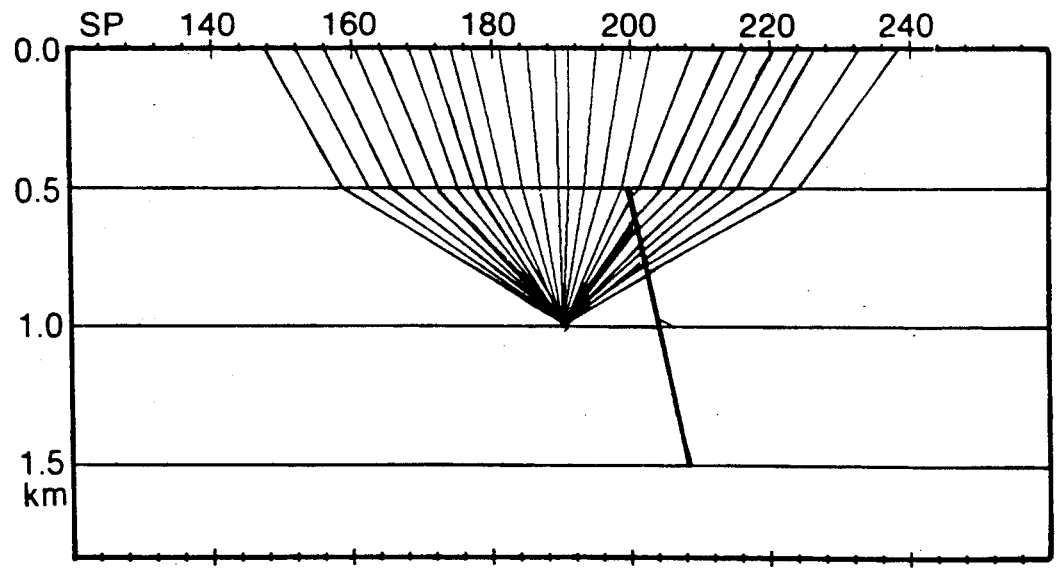
FIG. 5 illustrates the ray paths of the common reflection point (CRP) gather at SP 190.

In FIG. 5 the ray paths for the CRP at SP 190 is plotted and in FIG. 4 the ray paths for the common midpoint (CMP) gather is plotted. In FIG. 4, the reflection point for the rays in the CMP smear over four shot intervals, whereas in FIG. 5, all the rays in the CRP reflect off the same point. This is how a common reflection point (CRP) gather is defined. Thus, trying to observe the same effect on a common midpoint gather would not be as accurate.

Figure 6A:
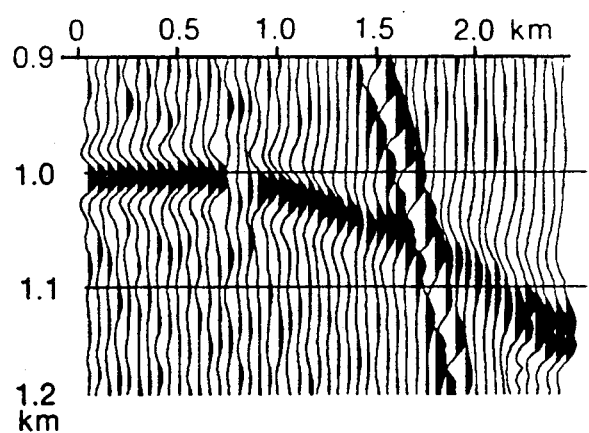
FIGS. 6A-11B illustrates the influence of fault dip and location on common reflection point (CRP) migration velocity scans at SP 190.
Figure 6B:
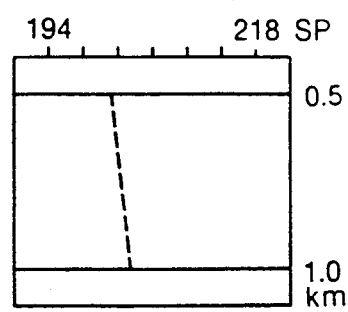
Figure 7A:
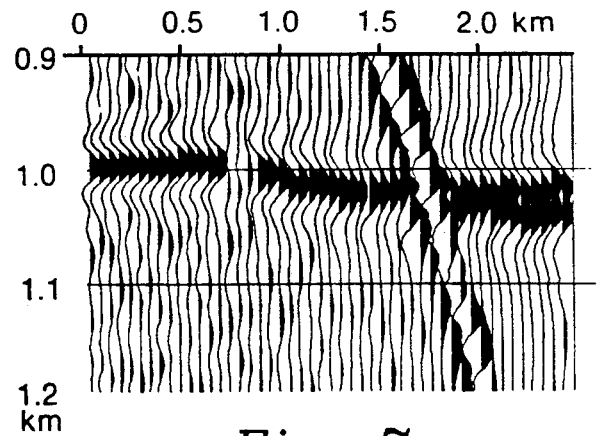
Figure 7B:
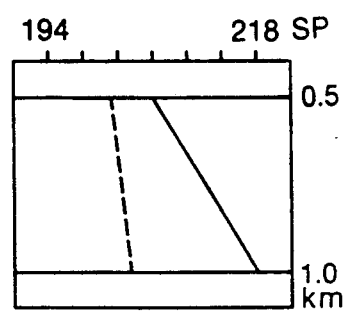

In the flowchart of FIG. 2, at block 26, a CRP gather is constructed near the fault. FIG. 6A is the same as FIG. 3C which is an illustration of a CRP gather at SP 190 near the fault boundary. FIG. 6B shows the corresponding portion of the velocity model with the true fault location indicated by the dashed line. At block 28 an estimated fault location is added to the velocity model, as illustrated in FIGS. 7A and 7B. The velocities on either side of the fault are correct as can be shown b separated CRP velocity analysis at points far from the fault. However, the fault separating the two regions has not been put in correctly, thus the event in the CRP image is not flat.

Figure 8A:
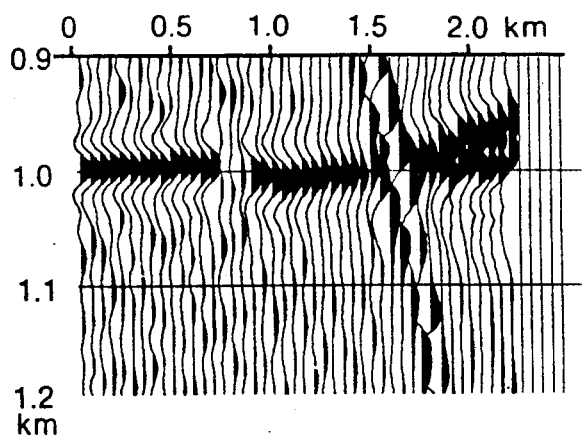
Figure 8B:
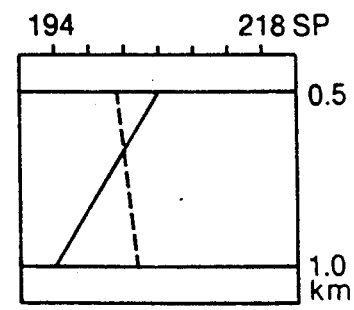
Figure 9A:
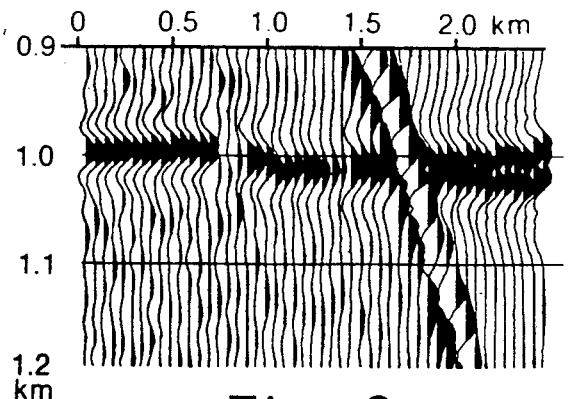
Figure 9B:
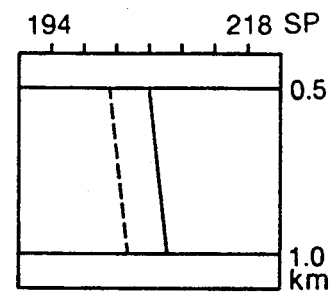

At blocks 30 and 32 of the flowchart, the dip of the fault is varied until the CRP gather image is flat indicating that the dip of the fault in the model is correct. FIGS. 8A and 8B show how the CRP image looks if the fault is put in dipping in the opposite direction. As seen in FIGS. 7A, 7B, 8A and 8B, the CRP image dips up or down if the dip of the fault is not correct. In FIGS. 9A and 9B, the fault in the model has the correct dip and the CRP image is now flat at the far offsets. Thus, the dip of the CRP image is the indicator for whether the dip of the fault is correct if the velocities are correct for the regions on either side of the fault.

Figure 10A:
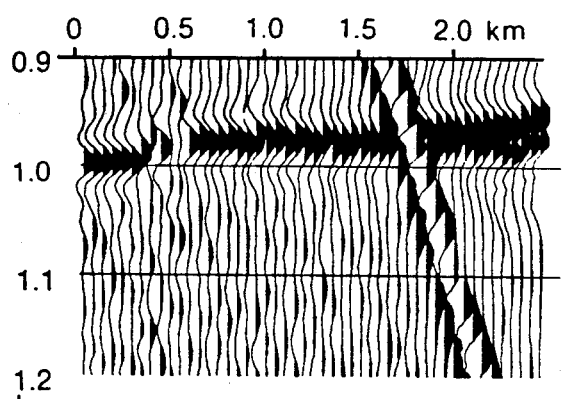
Figure 10B:
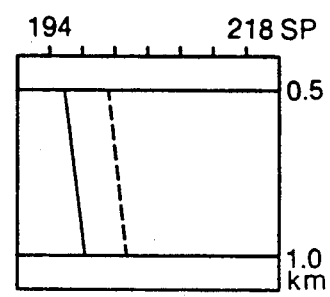

Although the CRP image is now flat at the far offsets indicating the correct dip of the fault, there is a discontinuity of the CRP gather as can be seen in FIGS. 9A and 9B. This discontinuity or broken-image event on the CRP gather indicates an incorrect fault location in the model. At blocks 34 and 36 of the flowchart, the location of the fault is varied to the right or to the left in the velocity model until the discontinuity or broken-image event on the CRP gather image is eliminated. In FIGS. 9A and 9B the fault location is to the right of the correct location and in FIGS. 10A and 10B the fault location is to the left of the correct location. As can be seen in the CRP images, the discontinuity is up in FIG. 9A when the fault location is too far to the right and the discontinuity is down in FIG. 10A when the fault location is too far to the left.

Figure 11A:
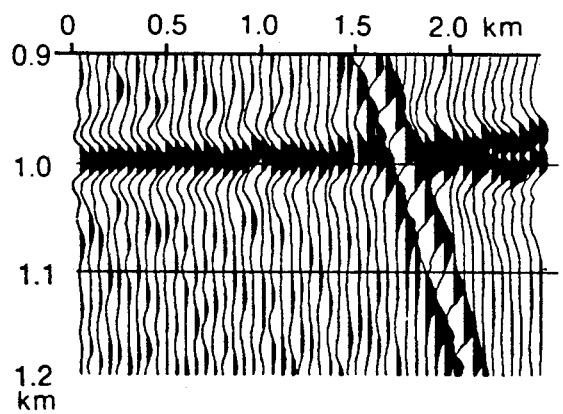
Figure 11B:
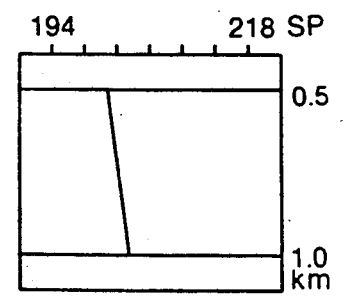

However, as illustrated in FIGS. 11A and 11B, the fault is located correctly and the discontinuity disappears. Therefore, at block 38 in the flowchart, both the dip and the location of the fault are correct which gives a CRP image that is both flat and has no discontinuities, as shown in FIG. 11A. The method of the present invention may also be analyzed using a series of CRP gathers rather than a single CRP gather, which would improve the accuracy of the model.

The present invention has been described by way of a preferred embodiment for illustration purposes only. It is understood that one skilled in the art may make modifications to the present invention without departing from the scope of the following claims.

What is claimed is:

1. A method for determining near vertical boundary locations from seismic data comprising the steps of:
    receiving seismic data including a velocity model;
    ascertaining presence of a near vertical boundary in the velocity model;
    finding velocities on either side of the near vertical boundary using common reflection point (CRP) velocity analysis on said model;
    constructing a CRP gather at a selected velocity near the near vertical boundary on said model;
    varying the dip of the near vertical boundary in the velocity model until the CRP gather image is flat, wherein the correct near vertical boundary dip is determined; and
    varying the location of the near vertical boundary to the right or the left in the velocity model until discontinuities on the CRP gather image are eliminated, wherein the correct near vertical boundary location is determined.

2. The method of claim 1 wherein the step of constructing a CRP gather near the near vertical boundary further includes:
    constructing a series of CRP gathers wherein the correct near vertical boundary location can be determined from the series of CRP gathers.

3. An apparatus for determining near vertical boundary locations from seismic data comprising:
    means for receiving seismic data including a velocity model;
    means for ascertaining presence of a near vertical boundary in the velocity model;
    means for finding velocities on either side of the near vertical boundary using common reflection point (CRP) velocity analysis on said model;
    means for constructing a CRP gather at a selected velocity near the near vertical boundary on said model;
    first means for varying the dip of the near vertical boundary in the velocity model until the CRP gather image is flat, wherein the correct near vertical boundary dip is determined; and
    second means for varying the location of the near vertical boundary to the right or the left in the velocity model until discontinuities on the CRP gather image are eliminated, wherein the correct near vertical boundary location is determined.

4. The apparatus of claim 3 wherein the means for constructing a CRP gather near the near vertical boundary further includes:
    means for constructing a series of CRP gathers wherein the correct near vertical boundary location can be determined from the series of CRP gathers.

* * * * *